United States Patent
Trimper et al.

(10) Patent No.: US 8,336,773 B2
(45) Date of Patent: Dec. 25, 2012

(54) SYSTEMS AND METHODS FOR ACCESSING MEDIA CONTENT USING MULTIPLE USER INPUT DEVICES

(75) Inventors: John Trimper, Groton, MA (US); Michael Alan Weintraub, Medfield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 219 days.

(21) Appl. No.: 11/603,561

(22) Filed: Nov. 22, 2006

(65) Prior Publication Data
US 2008/0120635 A1 May 22, 2008

(51) Int. Cl.
*G06K 5/00* (2006.01)
*H04N 7/16* (2011.01)
(52) U.S. Cl. ...................................... 235/382; 725/139
(58) Field of Classification Search .................. 235/35, 235/382; 725/35, 11, 30, 139; 348/734; 709/220
See application file for complete search history.

(56) References Cited

U.S. PATENT DOCUMENTS

| | | | |
|---|---|---|---|
| 5,663,756 A * | 9/1997 | Blahut et al. | 725/30 |
| 5,963,624 A * | 10/1999 | Pope | 379/110.01 |
| 6,359,661 B1 * | 3/2002 | Nickum | 348/734 |
| 7,111,320 B1 * | 9/2006 | Novak | 725/139 |
| 7,378,984 B2 * | 5/2008 | Suzuki et al. | 340/825.69 |
| 7,562,128 B1 * | 7/2009 | Caris et al. | 709/220 |
| 2002/0059588 A1 * | 5/2002 | Huber et al. | 725/35 |
| 2003/0066075 A1 * | 4/2003 | Bahn et al. | 725/25 |
| 2004/0095316 A1 * | 5/2004 | Shibamiya et al. | 345/156 |

FOREIGN PATENT DOCUMENTS
WO  WO 2005074565 A2 *  8/2005

\* cited by examiner

*Primary Examiner* — Thien M. Le
*Assistant Examiner* — Sonji Johnson

(57) ABSTRACT

A system includes a media content processing subsystem and a plurality of user input devices each configured to transmit at least one command to the media content processing subsystem. Each of the user input devices also corresponds to a distinct user profile. When the media content processing subsystem receives a command from one of the user input devices, the media content processing subsystem is configured to identify the particular user input device that transmitted the command and execute the command in accordance with a user profile that corresponds to that particular user input device.

29 Claims, 15 Drawing Sheets

Fig. 13

SYSTEMS AND METHODS FOR ACCESSING MEDIA CONTENT USING MULTIPLE USER INPUT DEVICES

BACKGROUND INFORMATION

The advent of computers, interactive electronic communication, the Internet, and other advances in the digital realm of consumer electronics have resulted in a great variety of enhanced programming, recording, and viewing options for users who view media content such as television programs. In implementing such enhanced options, the set-top box ("STB") has become an important computing device for accessing media content services and the media content within those services. In addition to supporting traditional analog broadcast video functionality, STBs also support an increasing number of two-way digital services such as video-on-demand, internet protocol television ("IPTV"), and personal video recording.

An STB is typically connected to a cable or satellite, or generally, a subscriber television system, and includes hardware and software necessary to provide enhanced options for a subscriber television system at a subscriber location. Conventional STBs include a processor, communication components, and memory and are connected to a television or other display device, such as a personal computer. While many STBs are stand-alone devices that are externally connected to a television, an STB and/or its functionality may be integrated into a television or personal computer, a mobile device such as a mobile phone or a personal digital assistant ("PDA"), or even into an audio device such as a programmable radio, as is known.

An STB is usually configured to provide users with a large number and variety of media content choices. For example, a user may choose to access a variety of broadcast television programs, pay-per-view services, video-on-demand programming, Internet services, and audio programming via an STB.

With such a wide variety of available media content, it is often desirable to restrict or block certain media content instances deemed inappropriate to minors and others. Parental control devices, such as V-chips, allow a parent or guardian to automatically block media content instances that contain material considered to be inappropriate to minors such as, but not limited to, sexually explicit material, violence, profanity, etc.

However, current parental control devices are often cumbersome to program and are often easily bypassed. Moreover, parents or other authorized users often have to enter an access code or perform some other inconvenient task in order to access blocked programming.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 13 illustrates an exemplary program guide graphical user interface that may be displayed by the display device according to principles described herein.

DETAILED DESCRIPTION OF EXEMPLARY EMBODIMENTS

Exemplary systems and methods for accessing one or more media content instances via a media content processing subsystem are described herein. As used herein, the term "media content instance" will be used to refer generally to any television program, on demand program, pay-per-view program, broadcast media program, Internet Protocol Television ("IPTV"), commercial, advertisement, video, movie, song, image, photograph, sound, or any segment of these or other forms of media content that may be experienced or viewed by a user.

The exemplary systems and methods described herein generally enable a media content experience to be customized for different users of a media content processing subsystem. The term "customizing a media content experience" and variations thereof will be used herein to refer to setting one or more viewing preferences for a user, restricting access to one or more media content instances for the user, allowing access to one or more media content instances for the user, and/or otherwise customizing the interaction between the media content processing subsystem and the user.

In some examples, a plurality of user input devices is each configured to transmit at least one command to a media content processing subsystem (e.g., a set-top box or a television set). Each of the user input devices may correspond to a distinct user profile. Alternatively, a subset of the user input devices may each correspond to the same user profile. As used herein, the term "user profile" refers to a set of one or more customized or personalized settings that affect any aspect of media content that may be accessed via the media content processing subsystem.

When the media content processing subsystem receives a command from one of the user input devices, the media content processing subsystem is configured to identify the particular user input device that transmitted the command and execute the command in accordance with a user profile that corresponds to that particular user input device.

Components and functions of the exemplary systems and methods described herein will now be described in more detail.

Figure 1:
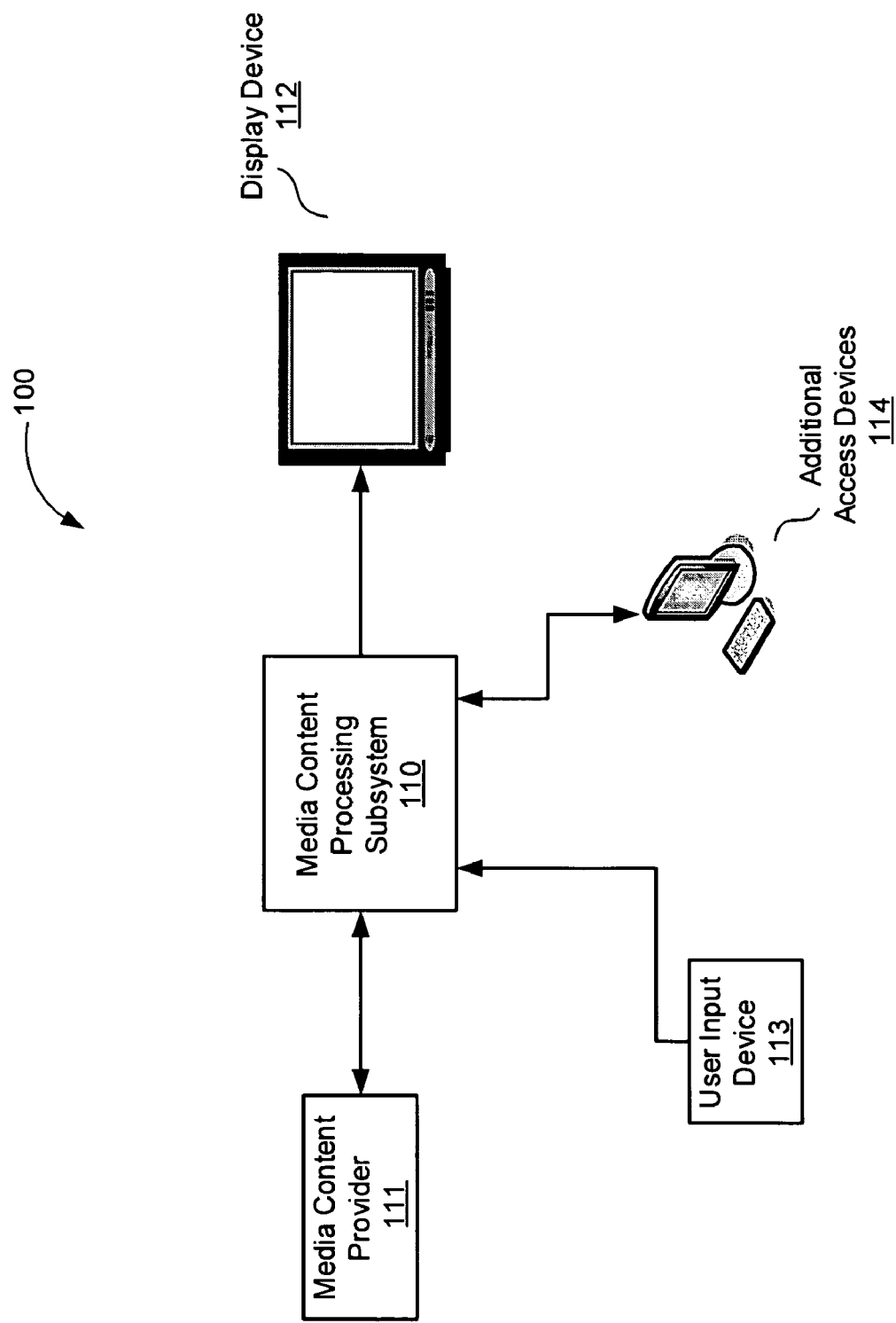
FIG. 1 illustrates an example of a media content access system according to principles described herein.

FIG. 1 illustrates an exemplary media content access system 100. Media content access system 100 may take many different forms and include multiple and/or alternate components and facilities.

As shown in FIG. 1, a media content processing subsystem 110 is configured to communicate with and receive a signal or data stream (e.g., a media content stream) containing a media content instance from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, and other suitable communications networks and technologies.

The media content processing subsystem 110 may use any suitable technology or technologies to receive the media content instance from the media content provider 111, including using a tuner to receive the media content instance, as described below. The media content processing subsystem 110 may be configured to process the media content stream provided by the media content provider 111, including causing the media content instance, or one or more components (e.g., video and/or audio components) of the media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the media content processing subsystem 110 may provide a signal to a display device 112 (e.g., a television, computer monitor, etc.) so that the display device 112 may present (e.g., display) the media content instance for experiencing by the user.

As shown in FIG. 1, and as will be described in more detail below, the media content processing subsystem 110 may be controlled by a user input device 113 (e.g., a remote control device) and/or a number of additional access devices 114 (e.g., a personal computer, wireless device, mobile phone, etc.).

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

Media content provider 111 is configured to provide various types of media content via a satellite, cable system, subscriber television network, the Internet, optical fiber network, wireless network, or any other suitable network. The media content may include, but is not limited to audio-visual content (e.g., broadcast television programs, pay-per-view services, IPTV, Digital Video Disc ("DVD") related content, or video-on-demand programming), pre-recorded media content, data communication services such as Internet services, images, and audio programming.

Figure 2:
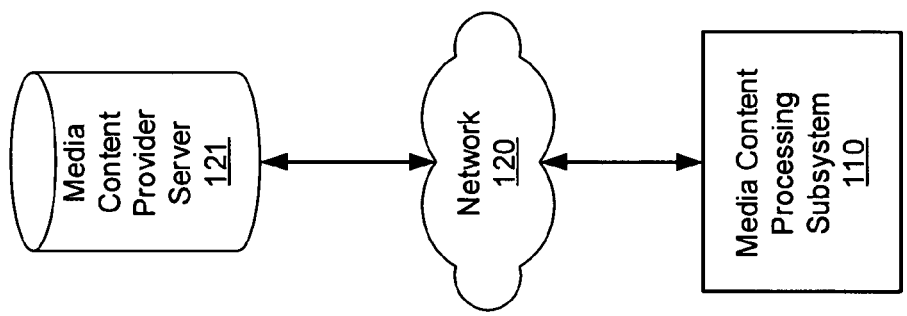
FIG. 2 is an illustration of an exemplary media content provider network according to principles described herein.

An exemplary media content provider 111 includes a media content provider server 121, as shown in FIG. 2. The media content provider server 121 may be configured to communicate with the media content processing subsystem 110 via one or more types of networks 120 (and communications links thereto). The network 120 shown in FIG. 2 may include the Internet, an intranet or other private packet-switched network, a cable television network (e.g., hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. In some alternative examples, the processing subsystem 110 may be connected directly to the media content provider server 121.

As mentioned, the processing subsystem 110 may be coupled to a display device 112 configured to present media content to a user. For example, the display device 112 may display or play the media content. The display device 112 may include, but is not limited to, a television, computer monitor, projector, mobile phone, handheld device, or any other device configured to present media content to a user.

Figure 3:
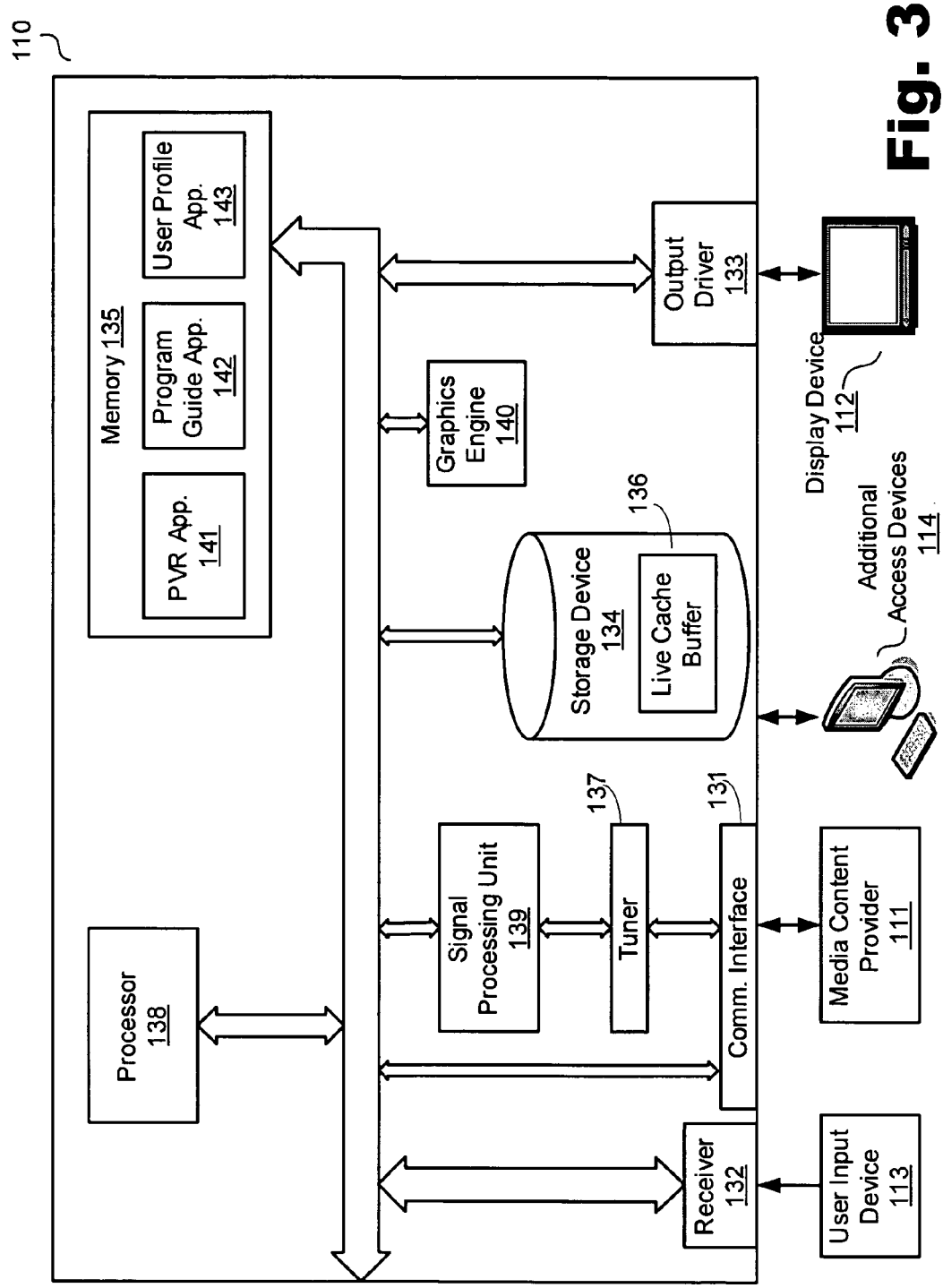
FIG. 3 is a block diagram of an exemplary media content processing subsystem according to principles described herein.

FIG. 3 is a block diagram of an exemplary media content processing subsystem 110 (or simply "processing subsystem 110"). The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible devices that receive and process digital and/or analog media content. Hence, an exemplary processing subsystem 110 may include, but is not limited to, a set-top box ("STB"), a home communication terminal ("HCT"), a digital home communication terminal ("DHCT"), a stand-alone personal video recorder ("PVR"), a television set, a DVD player, a video-enabled phone, and/or a personal computer.

In some examples, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of computing devices, and may employ any of a number of computer operating systems, including, but not limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

In some examples, the processing subsystem 110 may include a communication interface 131 configured to receive media content in any format from the media content provider 111 or from any other suitable media content source. The communication interface 131 may include any device, logic, and/or other technologies suitable for receiving signals and/or data representative of media content. In some examples, the communication interface 131 may include a single port configured to receive media content from the media content provider 111 and/or from any other source (e.g., from another processing subsystem, another server, etc.) For example, the communication interface 131 may include or be connected to a broadband connection, which can enable the processing subsystem 110 to receive media content on a single port from multiple sources. In other examples, multiple ports may be used. The communication interface 131 may be configured to interface with any suitable communication media, protocols, and formats, including any of those mentioned above.

The processing subsystem 110 may also include a receiver 132 configured to receive one or more input commands from one or more user input devices 113. An exemplary user input device 113 will be described in more detail below.

A number of additional access devices 114 may also be configured to communicate with the processing subsystem 110. These access devices 114 may include, but are not limited to, personal computers and mobile devices (e.g., laptops, PDAs, cellular phones, etc.). In some examples, the access devices 114 may be configured to access content stored and/or processed by the processing subsystem 110. For example, media content that has been recorded by the processing subsystem 110 may be accessed and viewed on a personal computer. Moreover, the additional access devices 114 may be used to program or otherwise control the functions of the processing subsystem 110.

The processing subsystem 110 may also include an output driver 133 configured to interface with or drive the display device 112. The output driver 133 may include any combination of hardware, software, and firmware as may serve a particular application.

As shown in FIG. 3, a storage device 134 may also be included within the processing subsystem 110. In some examples, the storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. Various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory (RAM), dynamic RAM (DRAM), or a combination thereof. In some examples, as will be described in more detail below, various applications used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. In some examples, media content data may be temporarily stored in the live cache buffer 136 to facilitate viewing of the media content in one or more trick play modes.

The storage device 134 may also include a tuner 137. Tuner 137 is configured to tune to a particular television channel, stream, address, frequency or other carrier (i.e., content carrier) in order to process media content that is transmitted on that carrier. In some examples, the tuner 137 may include multiple tuners such that multiple carriers of media content may be processed and/or shown on a display device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether the media content is to be deleted. As used herein, the term "permanent recording" will be understood to mean media content that is stored for an extended period of time as decided by the user.

As shown in FIG. 3, the processing subsystem 110 may include one or more processors, such as processor 138, configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

In some examples, if the incoming media content is in the form of IP data packets (e.g., in IPTV configurations), the media content may be processed directly by the processor 138 and/or any other processor configured to process IP data packets.

The processing subsystem 110 may also include a graphics engine 140 configured to generate graphics that are to be displayed by the display device 112. The graphics may include graphical user interfaces ("GUIs") such as, but not limited to, one or more program guides, progress bars, and other graphics.

Also shown in FIG. 3 are one or more applications 141-143 that may be included within the processing subsystem 110. These applications 141-143 may be executed upon initiation by a user of the processing subsystem 110. The applications 141-143, or application clients, may reside in memory 135 or in any other area of the processing subsystem 110 and be executed by the processor 138. The applications 141-143 shown in FIG. 3 are merely illustrative of the many different applications that may reside within the processing subsystem 110.

As shown in FIG. 3, one of the applications may include a personal video recording (PVR) application 141. A PVR application is also referred to as a digital video recording (DVR) application. As used herein, the term "PVR application" will be used to refer to any application or device configured to record media content and/or provide for the viewing of media content in trick play mode. As previously mentioned, trick play modes include, but are not limited to, slow motion, fast motion, reverse play, fast forward play, instant replay, jumping, pausing of live broadcast, and scanning. The PVR application 141 may also provide for media content recording functionality by enabling the temporary and/or permanent recording of media content to the storage device 134.

The processing subsystem 110 may additionally or alternatively include a program guide application 142 configured to generate a program guide that is displayed on the display device 112. An exemplary program guide includes a GUI that performs various functions including allowing a user to select and/or view information and options associated with various media content instances.

In some examples, the processing subsystem 110 includes a user profile application 143 configured to enable a user to program one or more user profiles within the processing subsystem 110. As mentioned previously, a user profile may include one or more customized or personalized settings that affect any aspect of media content that may be accessed via the processing subsystem 110. For example, as will be described in more detail below, a user profile may include a "whitelist" specifying one or more accessible media content instances, a "blacklist" specifying one or more media content access restrictions, customized display settings, and/or any other customized setting. Exemplary user profiles will be described in more detail below.

In some examples, a user may control the processing subsystem 110 with a user input device 113 (or simply "input device 113"). The input device 113 may include, for example, a remote control, keyboard, or any other suitable input device and may be configured to communicate with the receiver 132 via a wireless link, electrical connection, or any other suitable communication link.

Figure 4:
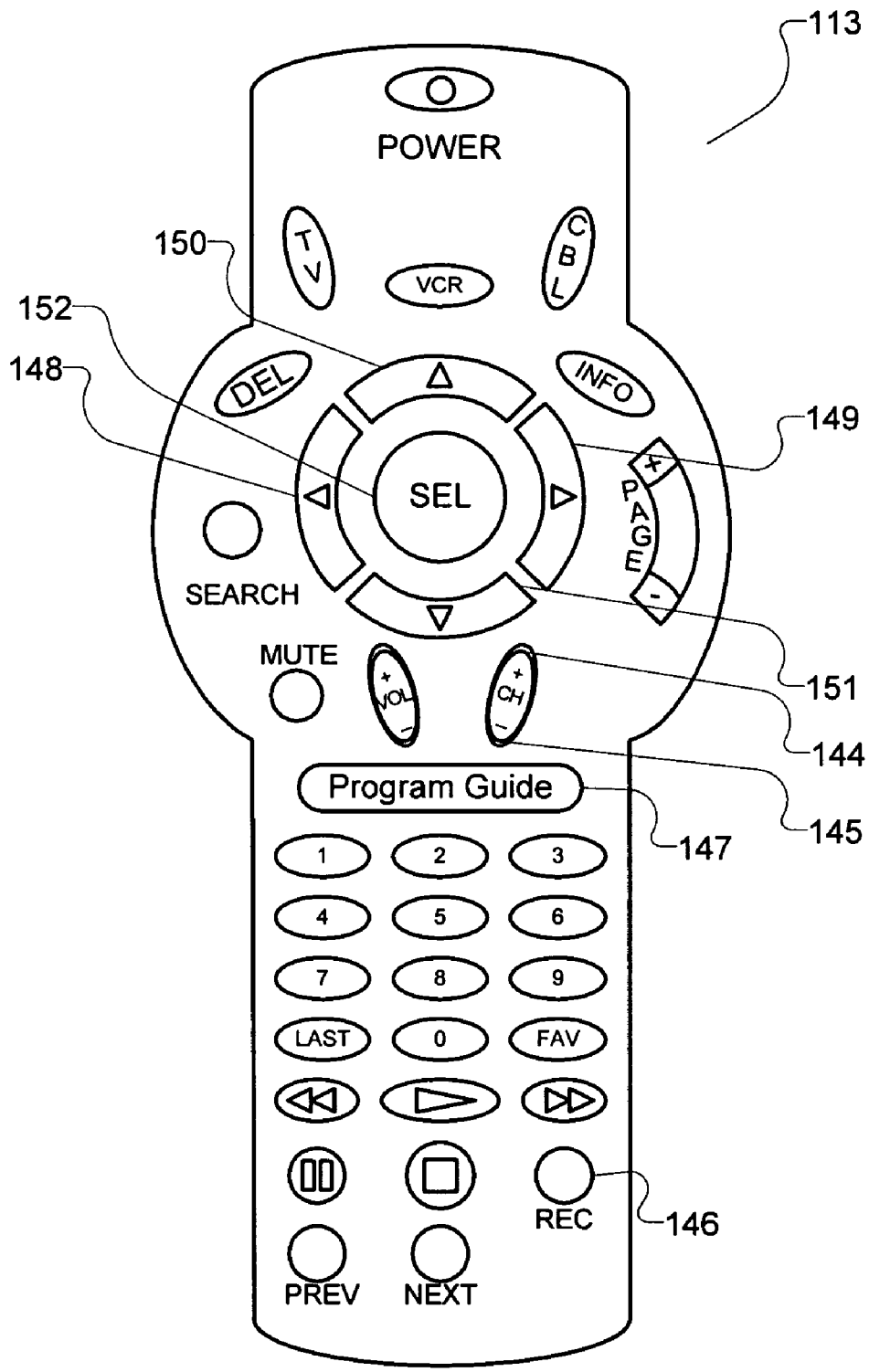
FIG. 4 illustrates an exemplary user input device according to principles described herein.

An exemplary remote control input device 113 is illustrated in FIG. 4. It will be recognized that the input device 113 shown in FIG. 4 is merely illustrative of the many different types of input devices that may be used in connection with the present systems and methods.

In some examples, the input device 113 may include any number of buttons or keys configured to enable a user to control various options related to media content available via the processing subsystem 110. For example, channel up and down buttons 144 and 145 enable a user to navigate to and between various media content instances. A record button 146 may also be included which enables the user to designate as permanently recorded any media content instance buffered in the live cache buffer 136. A program guide button 147 may be configured to evoke the display of a program guide on the display device 112. A left button 148, right button 149, up button 150, down button 151, and select button 152 may also be included and configured to enable the user to evoke and/or navigate through various views and graphical user interfaces displayed by the display device 112.

Many input devices, such as the remote control input device 113 shown in FIG. 4, communicate with the processing subsystem 110 by transmitting infrared ("IR") commands that are detected and decoded by the processing subsystem 110. However, it will be recognized that the input device 113 may be configured to transmit commands to the processing subsystem 110 using any other suitable communication link.

In some examples, each button or key that is a part of the input device 113 corresponds to a unique control code or binary word. Hence, when a particular button is pressed, a control code corresponding to that button is included within the command that is transmitted to the processing subsystem 110. The processing subsystem 110 may then recognize which button was pressed by detecting and decoding the unique control code.

To illustrate, Table 1 shows an exemplary 8-bit encoding scheme that may be used to represent various buttons that are a part of the input device 113. It will be recognized that the encoding scheme shown in Table 1 is merely illustrative of the many different encoding schemes that may be used to represent the various buttons that may be a part of the input device 113. Moreover, it will be recognized that the length of each control code or encoding representation may also vary as may serve a particular application.

TABLE 1

| Input Device Button | Control Code |
|---|---|
| 1 | 0000 0000 (0) |
| 2 | 0000 0001 (1) |
| 3 | 0000 0010 (2) |
| 4 | 0000 0011 (3) |
| 5 | 0000 0100 (4) |
| 6 | 0000 0101 (5) |
| 7 | 0000 0110 (6) |
| 8 | 0000 0111 (7) |
| 9 | 0000 1000 (8) |
| 0 | 0000 1001 (9) |
| Select | 0000 1011 (11) |
| Channel up | 0001 0000 (16) |
| Channel down | 0001 0001 (17) |
| Volume up | 0001 0010 (18) |
| Volume down | 0001 0011 (19) |
| Power on | 0001 0101 (21) |
| Power off | 0010 1111 (47) |
| Mute | 0001 0100 (20) |

As shown in Table 1, each button that is a part of the input device 113 corresponds to a unique 8-bit control code. The decimal equivalent to each 8-bit control code is shown in parenthesis in Table 1 for illustrative purposes. When a particular button is pressed, the input device 113 transmits the control word corresponding to that button to the processing subsystem 110. For example, if the user presses the channel up button 144, the input device 113 transmits a "00010000" to the processing subsystem 110. The processing subsystem 110 is configured to recognize the transmitted control word and execute or perform the specified command (e.g., channel up).

To facilitate an understanding of the methods and systems described herein, a number of exemplary configurations will now be described wherein one or more input devices 113 are used to control the processing subsystem 110.

Figure 5:
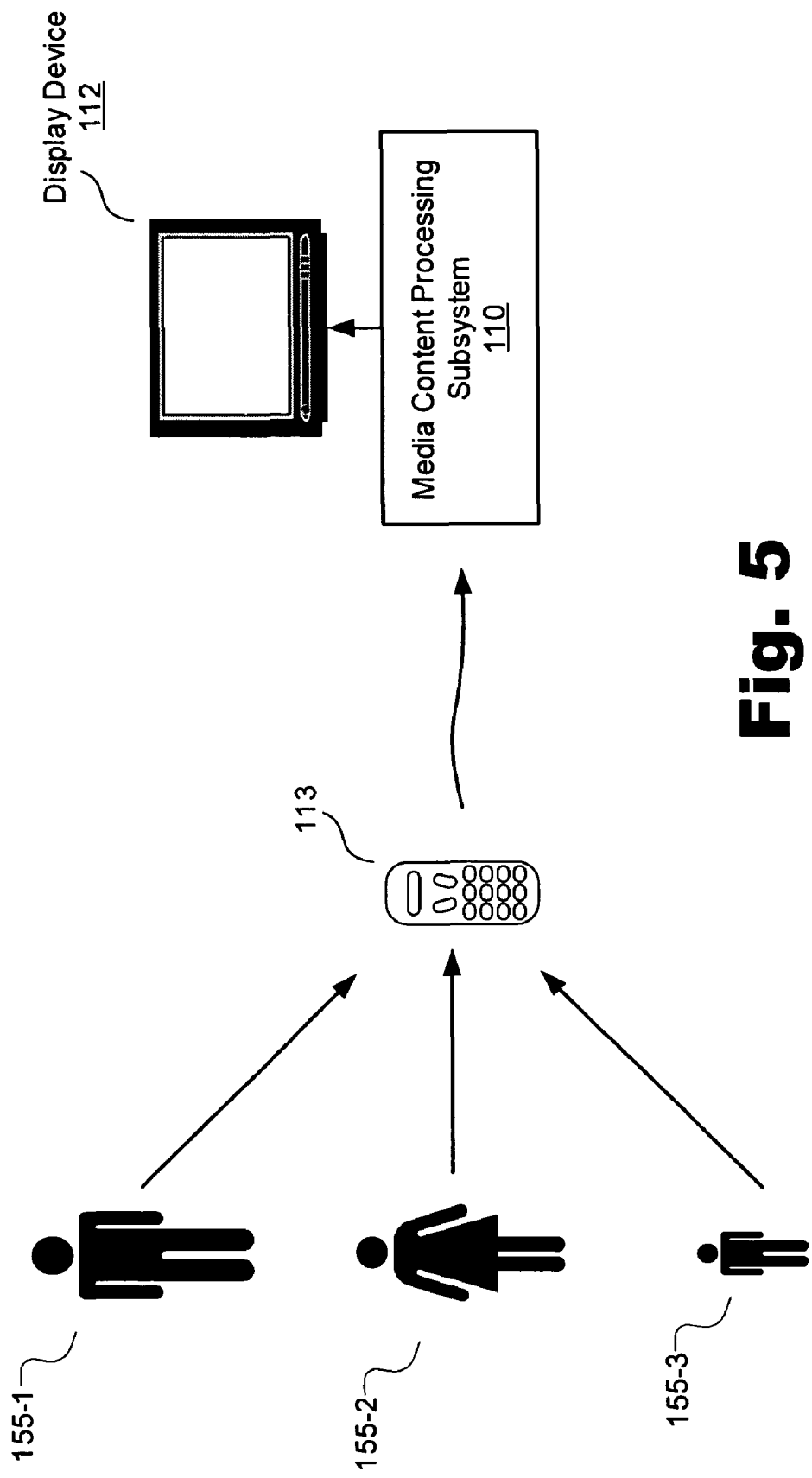
FIG. 5 illustrates an exemplary configuration wherein a single input device is used by multiple users to control a media content processing subsystem according to principles described herein.

FIG. 5 illustrates an exemplary configuration wherein a single input device 113 is used by multiple users (e.g., 155-1 through 155-3, collectively referred to herein as 155) to control the media content processing subsystem 110. The users 155 may include a father 155-1, mother 155-2, and/or child 155-3, for example. FIG. 5 shows three users 155 for illustrative purposes only. It will be recognized that any number of users may control the processing subsystem 110 with the input device 113 shown in FIG. 5.

In some examples, each user may have different viewing preferences and/or desire to access different media content instances via the processing subsystem 110. Additionally or alternatively, it may be desirable to restrict access to certain media content instances for a particular user (e.g., the child 155-3).

To this end, a plurality of input devices 113 may be used to customize or personalize a media content experience for each user of the processing subsystem 110. In some examples, customization of the media content experience may be facilitated by providing a different input device 113 for each user of the processing subsystem 110. Each input device 113 is configured to control the processing subsystem 110 in accordance with one or more corresponding user profiles. Hence, as will be described in more detail below, the same command transmitted from two different input devices 113 may result in the processing subsystem 110 taking two different actions.

Figure 6:
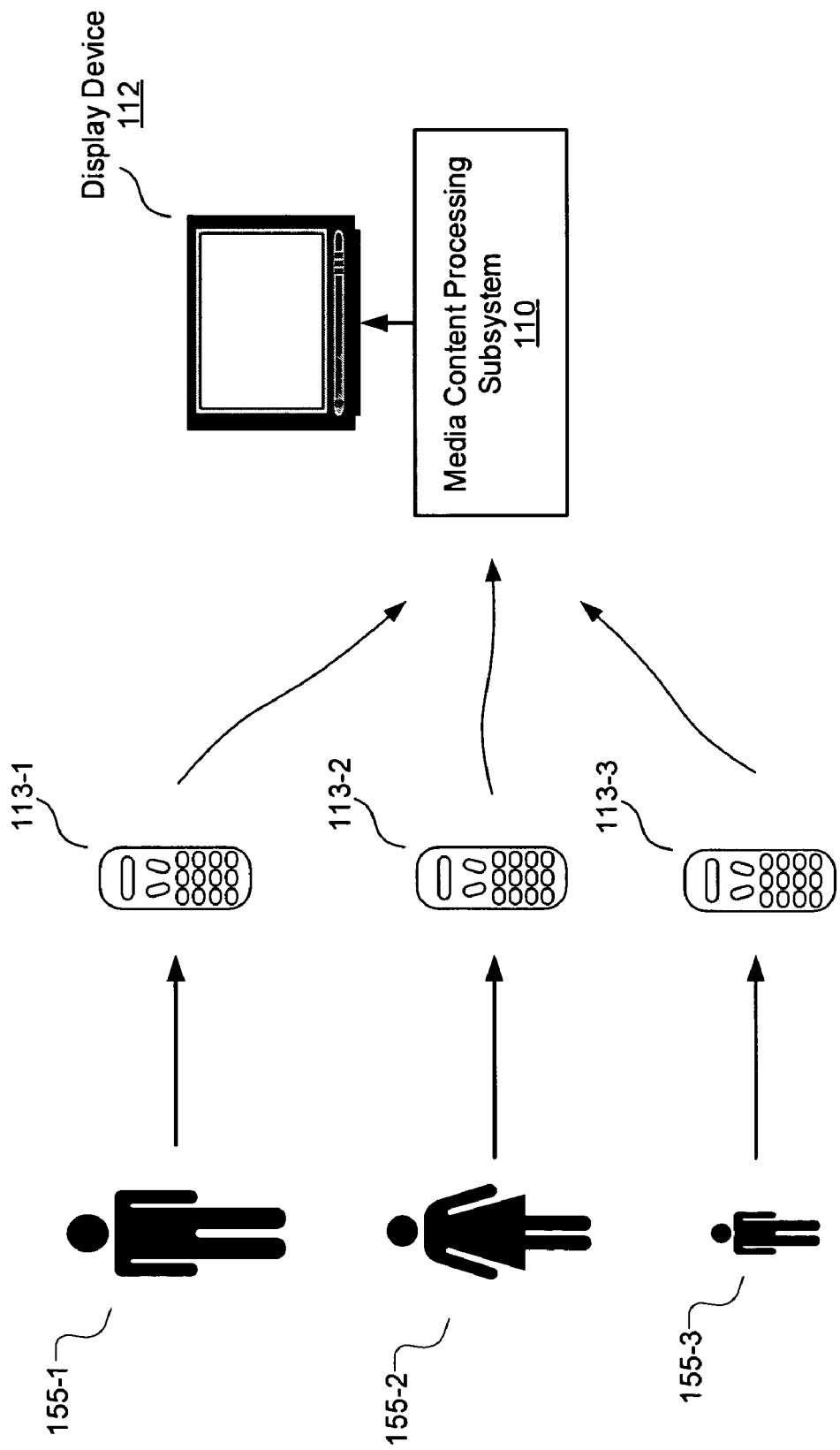
FIG. 6 illustrates an exemplary configuration wherein a different input device is provided for each user of the processing subsystem according to principles described herein.

FIG. 6 illustrates an exemplary configuration wherein a different input device (e.g., 113-1 through 113-3, collectively referred to herein as 113) is provided for each user 155 of the processing subsystem 110. As shown in FIG. 6, input device 113-1 corresponds to user 155-1, input device 113-2 corresponds to user 155-2, and input device 113-3 corresponds to user 155-3.

Each input device 113 shown in FIG. 6 is configured to transmit one or more commands to the processing subsystem 110. Each command may include a combination of one or more control codes, as described previously. In some examples, as will be described below, the processing subsystem 110 is configured to differentiate between the input devices 113 shown in FIG. 6. In this manner, the processing subsystem 110 may identify or recognize the source of a particular command that is transmitted thereto and execute the command in accordance with a user profile associated with that source.

Hence, in some examples, each input device 113 shown in FIG. 6 may have a unique set of control codes assigned thereto. In this manner, when a particular input device 113 transmits a command to the processing subsystem 110, the processing subsystem 110 may be able to recognize that the command was transmitted from that particular input device 113. In some alternative examples, a particular set of control codes corresponds to a group of multiple input devices 113 each configured to control the processing subsystem 110 in accordance with the same user profile.

Figure 7:
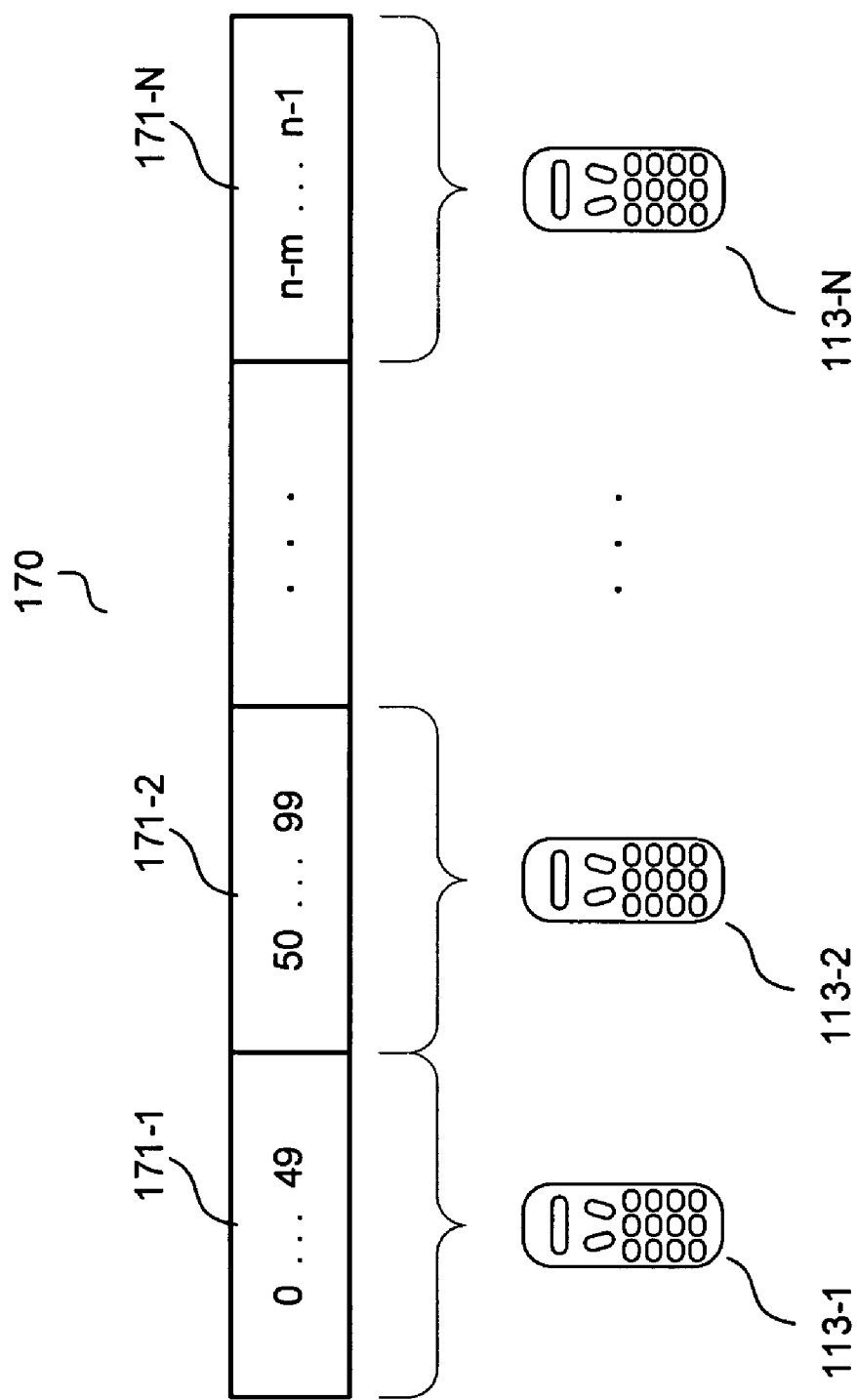
FIG. 7 illustrates a number of sets of control codes that may be assigned to a number of input devices according to principles described herein.

FIG. 7 illustrates a number of sets of control codes that may be assigned to a number of input devices 113 in accordance with the methods and systems described herein. It will be recognized that the control codes 170 shown in FIG. 7 may additionally or alternatively be partitioned in any other manner as may serve a particular application.

As shown in FIG. 7, there may exist n total control codes 170 from 0 to n−1. The total number of control codes 170 may vary as may serve a particular application. FIG. 7 shows the control codes 170 in decimal format for illustrative purposes. However, as described previously, the control codes 170 may each include a number of binary bits.

In some examples, the control codes 170 may be partitioned into a number of sets or blocks (e.g., 171-1 through 171-N, collectively referred to herein as 171). Each set 171 includes a number (m) of control codes 170 unique to that particular set 171. For example, each set 171 shown in FIG. 7 includes fifty control codes for illustrative purposes.

As shown in FIG. 7, each set of control codes 171 may be assigned to a particular input device 113. For example, the first set 171-1 may be assigned to the first input device 113-1, the second set 171-2 may be assigned to the second input device 113-2, and so forth until the last set 171-N is assigned to the last input device 113-N.

In some examples, the sets of control codes 171 are assigned to each input device 113 by the processing subsystem 110. In this manner, when the processing subsystem 110 receives a command from one of the input devices 113, the processing subsystem 110 may recognize the source of the command and execute the command in accordance with one or more user profiles that have been established for that input device 113.

Each button that is a part of a particular input device 113 may then be assigned a unique control code within the set of control codes 171 that corresponds to that particular input device 113. For example, the channel up button on the first input device 113-1 may be assigned a control code equal to sixteen, which is within the first set 171-1. However, the same channel up button on the second input device 113-2 may be assigned a control code equal to sixty-six, which is within the second set 171-2.

Hence, if a user of the first input device 113-1 presses the channel up button, a control code equal to sixteen is transmitted to the processing subsystem 110. The processing subsystem 110 will recognize the transmitted control code as being within the first set of control codes 171-1 and perform the channel up command in accordance with a user profile that has been established for the input device 113-1. Likewise, if a user presses the channel up button on the second input device 113-2, a control code equal to sixty-six is transmitted to the processing subsystem 110. The processing subsystem 110 will recognize the transmitted control code as being within the second set of control codes 171-2 and perform the channel up command in accordance with a user profile that has been established for the second input device 113-2.

Additionally or alternatively, each input device 113 may be configured to include a unique identifier within each command that is transmitted to the processing subsystem 110. In this manner, the processing subsystem 110 may be able to recognize the source of a particular command by detecting the identifier and execute the command in accordance with a user profile that has been established for that source.

Figure 8:
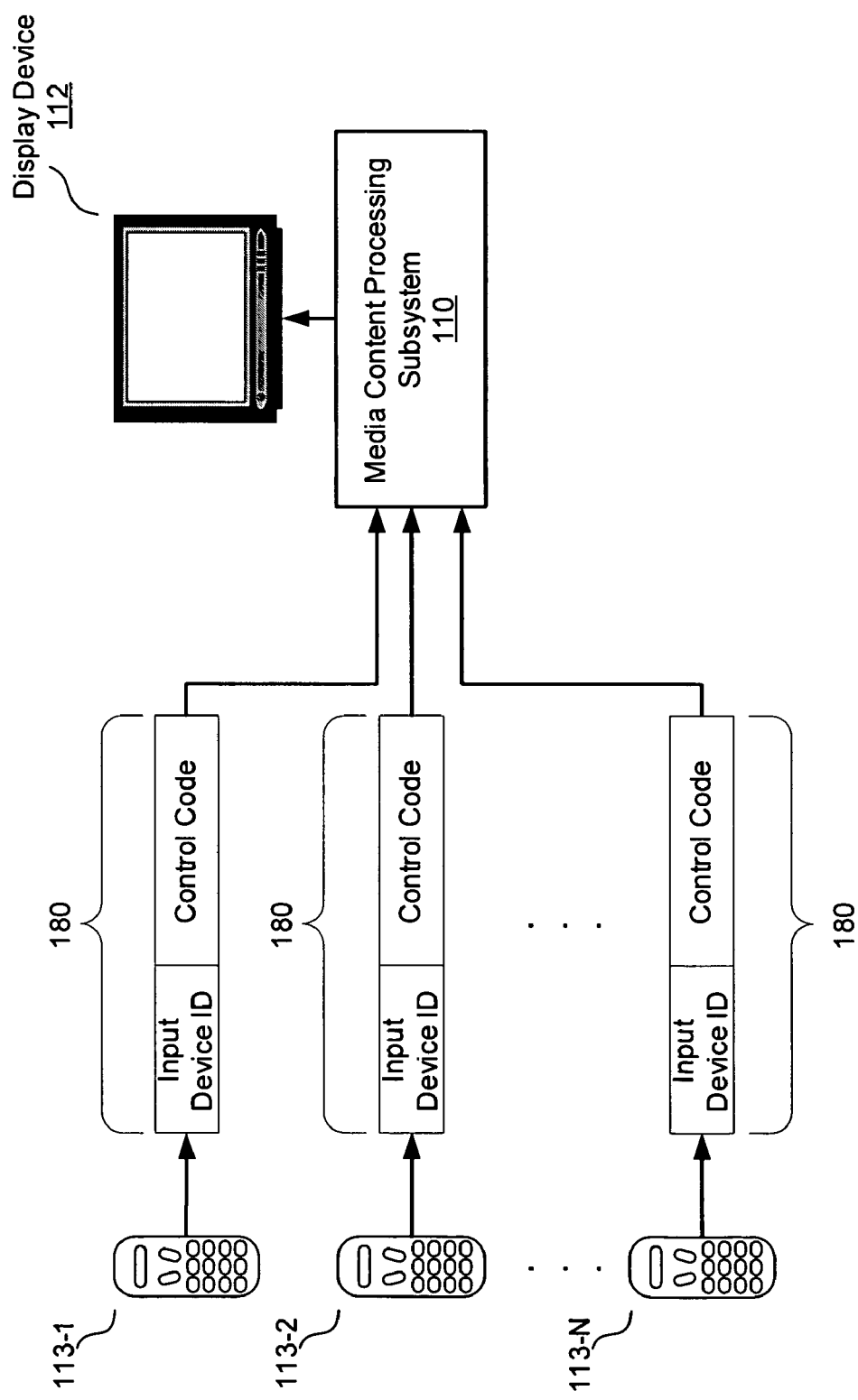
FIG. 8 illustrates an exemplary configuration wherein each input device is configured to include a unique identifier within each command that is transmitted to the processing subsystem according to principles described herein.

FIG. 8 illustrates an exemplary configuration wherein each input device 113 is configured to include a unique identifier within each command 180 that is transmitted to the processing subsystem 110. As shown in FIG. 8, the input device identifier may be included at the beginning of the command 180. Additionally or alternatively, the input device identifier may be included at the end of the command 180 and/or interspersed within the control codes that make up the command 180.

In some examples, the unique input device identifier may include any sequence of bits that uniquely identifies a particular input device 113. For example, the unique input device identifier may include, but is not limited to, a code functionally similar to a media access control ("MAC") address used at the data link layer for data communications.

In some examples, the unique identifier is inherent to a particular input device 113 and is programmed into the processing subsystem 110 so that the processing subsystem 110 may recognize the identifier when transmitted thereto. Alternatively, the processing subsystem 110 may assign a unique identifier to each input device 113 during an authentication process. The processing subsystem 110 may then be able to distinguish between command transmitted by different input devices 113 by detecting and processing the unique identifiers that are included within the command.

To illustrate, either the first input device 113-1 or the second input device 113-2 shown in FIG. 8 may transmit a channel up command (e.g., a control code equal to sixteen) to the processing subsystem 110. If a unique identifier is included within the command, the processing subsystem 110 may determine which input device 113-1 or 113-2 transmitted the control code and perform the channel up command in accordance with the appropriate user profile.

It will be recognized that in some examples, each input device 113 may have both a unique set of control codes 171 and a unique identifier assigned thereto.

Figure 9:
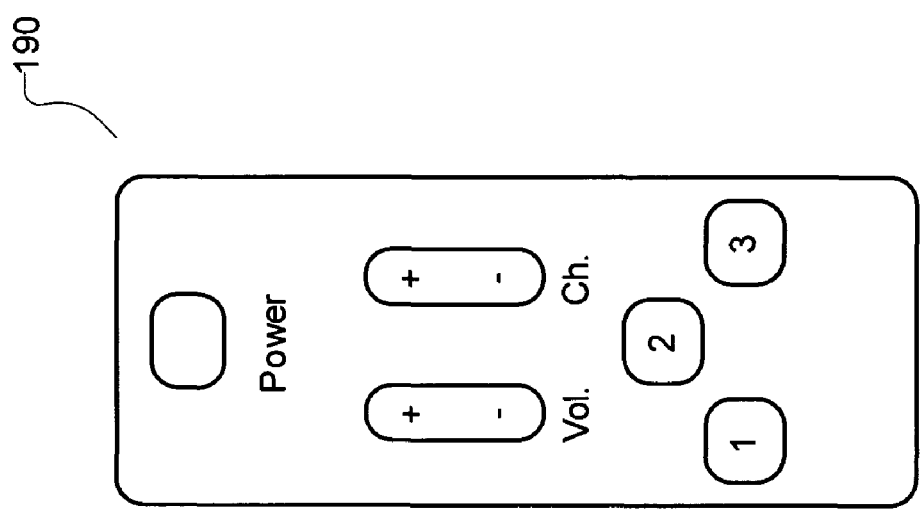
FIG. 9 illustrates an exemplary simplified input device according to principles described herein.

As mentioned, one or more of the users 155 may include one or more children. To this end, one or more of the input devices 113 may include a simplified input device. FIG. 9 illustrates an exemplary simplified input device 190 that may be used in accordance with the methods and systems described herein. The simplified input device 190 may also be referred to as a "kid's remote." As shown in FIG. 9, the simplified input device 190 may include a minimal set of buttons and may therefore be relatively easy to use. Hence, the simplified input device 190 may be more suitable for use by a child than a more complex input device.

It will be recognized that the simplified input device 190 may include any number and type of buttons as may serve a particular age bracket or child. Moreover, it will be recognized that the simplified input device 190 shown in FIG. 9 is merely illustrative of the many different types of alternative input devices that may be used in accordance with the methods and systems described herein.

In some examples, one or more of the input devices 113 may be protected by an access code or other security measure in order to prevent unauthorized use thereof. In this manner, a parent or guardian, for example, may prevent his or her child or ward from using an input device 113 associated with a user profile that is configured for an adult.

As mentioned, the input devices 113 described herein may be used to access one or more media content instances via the processing subsystem 110 in accordance with one or more user profiles. A number of exemplary settings that may be a part of a user profile will now be described.

Figure 10:
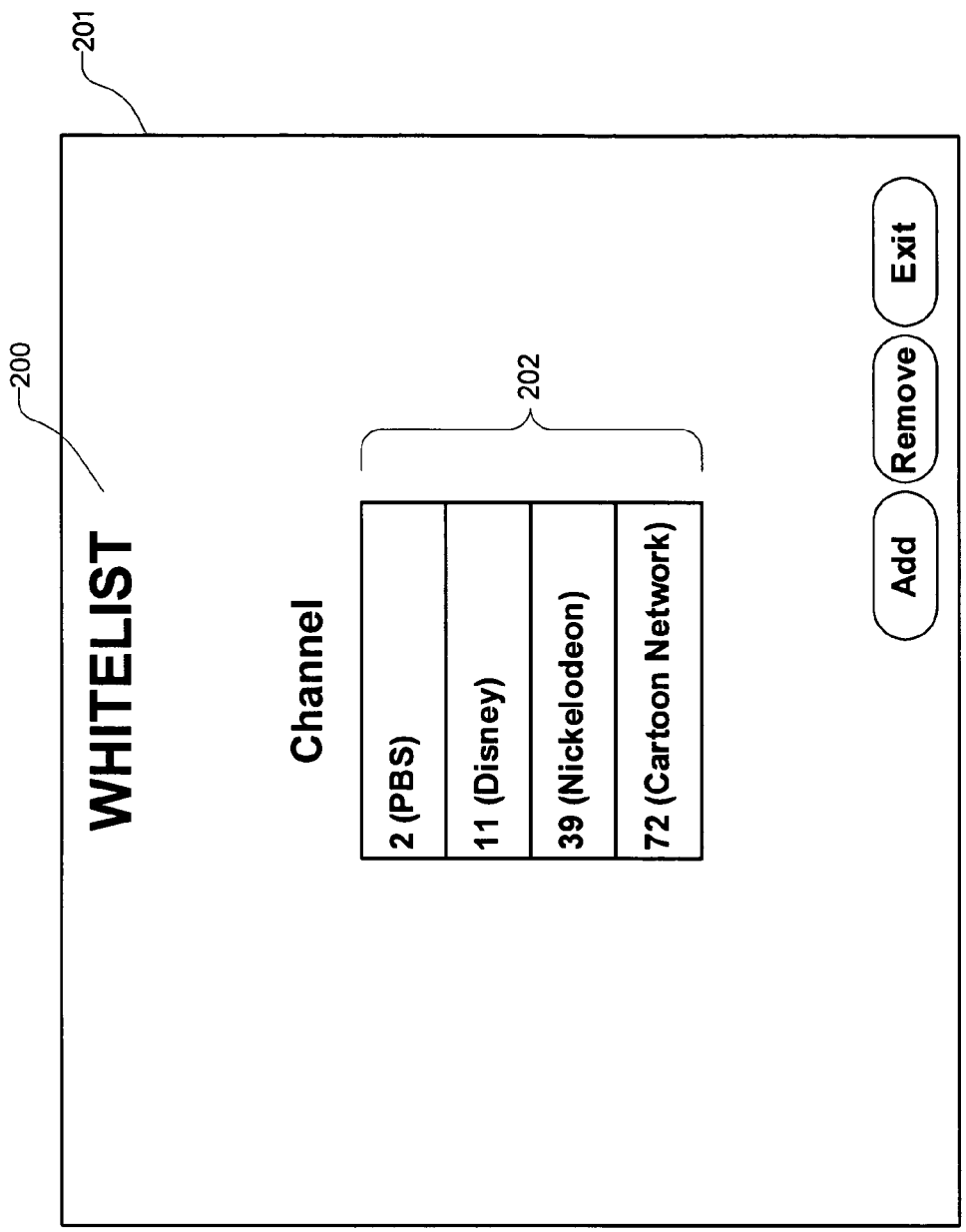
FIG. 10 illustrates an exemplary whitelist that may be a part of a particular user profile according to principles described herein.

FIG. 10 illustrates an exemplary whitelist 200 that may be a part of a particular user profile. As shown in FIG. 10, the whitelist 200 may be displayed as a GUI on a viewing screen 201 of the display device 112. Additionally or alternatively, the whitelist 200 may be displayed on any other access device 114. In some examples, the whitelist 200 may include an editable listing 202 of a number of channels that may be accessed by a user while the processing subsystem 110 is operating within the user profile. The listing 202 shown in FIG. 10 includes four channels (channels 2, 11, 39, and 72) for illustrative purposes only. It will be recognized that the whitelist 200 may be edited to include any number of channels as may serve a particular user profile.

In some examples, an input device 113 assigned to a particular user profile having the whitelist 200 may access only those channels listed within the whitelist 200. In this manner, for example, a parent may create a whitelist, such as whitelist 200, within a user profile associated with a particular input device (e.g., input device 113-3 shown in FIG. 6) that lists channels that the parent deems appropriate for a child. The child may then be allowed to only use that particular input device 113-3 to control the processing subsystem 110. When commands are transmitted to the processing subsystem 110 from the input device 113-3, the processing subsystem 110 recognizes that the commands come from the input device 113-3 and performs the commands in accordance with the rules specified in the whitelist 200.

Hence, if the child presses channel up or channel down on the input device 113-3, for example, the processing subsystem 110 skips channels not listed within the whitelist 200 and causes the display device 112 to display content associated with one of the channels listed within the whitelist 200. If the child tries to specifically key in the number of a channel that is not listed within the whitelist 200, the processing subsystem 110 may be configured to ignore the command, display an error message, or otherwise indicate to the child that the keyed-in channel is not accessible.

In some examples, the whitelist 200 may additionally or alternatively include an editable listing of one or more media content instances, one or more media content ratings, and/or any other rules that specify one or more media content instances that may be accessed by a user while within the corresponding user profile.

Figure 11:
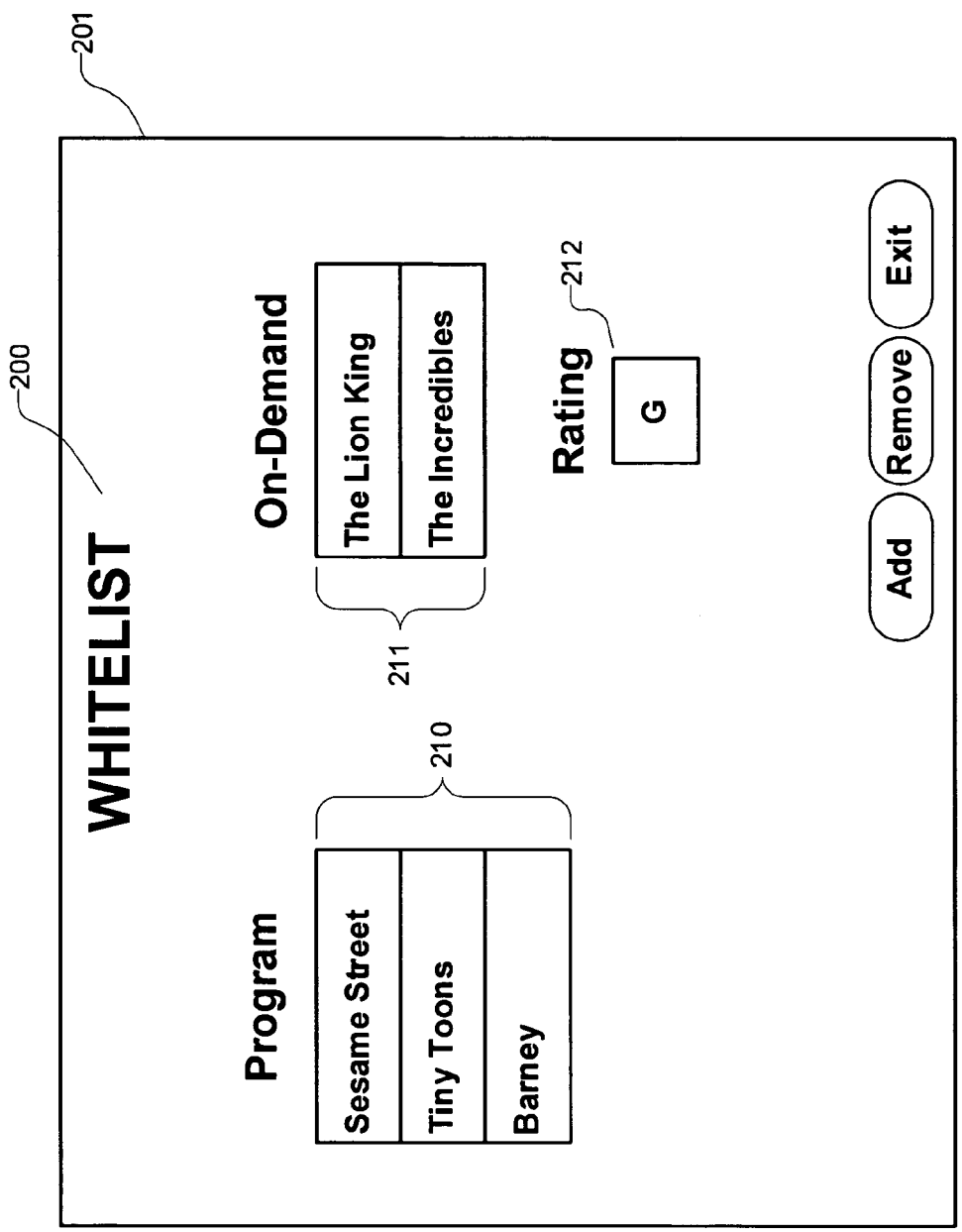
FIG. 11 illustrates another exemplary whitelist that may be a part of a particular user profile according to principles described herein.

For example, FIG. 11 shows that the whitelist 200 may include a number of specific media content instances 210 and 211 and allowable content ratings 212. An input device 113 assigned to a particular user profile having the whitelist 200 shown in FIG. 11 may access only those media content instances listed within the whitelist 200 or media content instances with a content rating of "G". It will be recognized that any number of media content instances and/or content ratings may be listed within the whitelist 200 as may serve a particular user profile.

Figure 12:
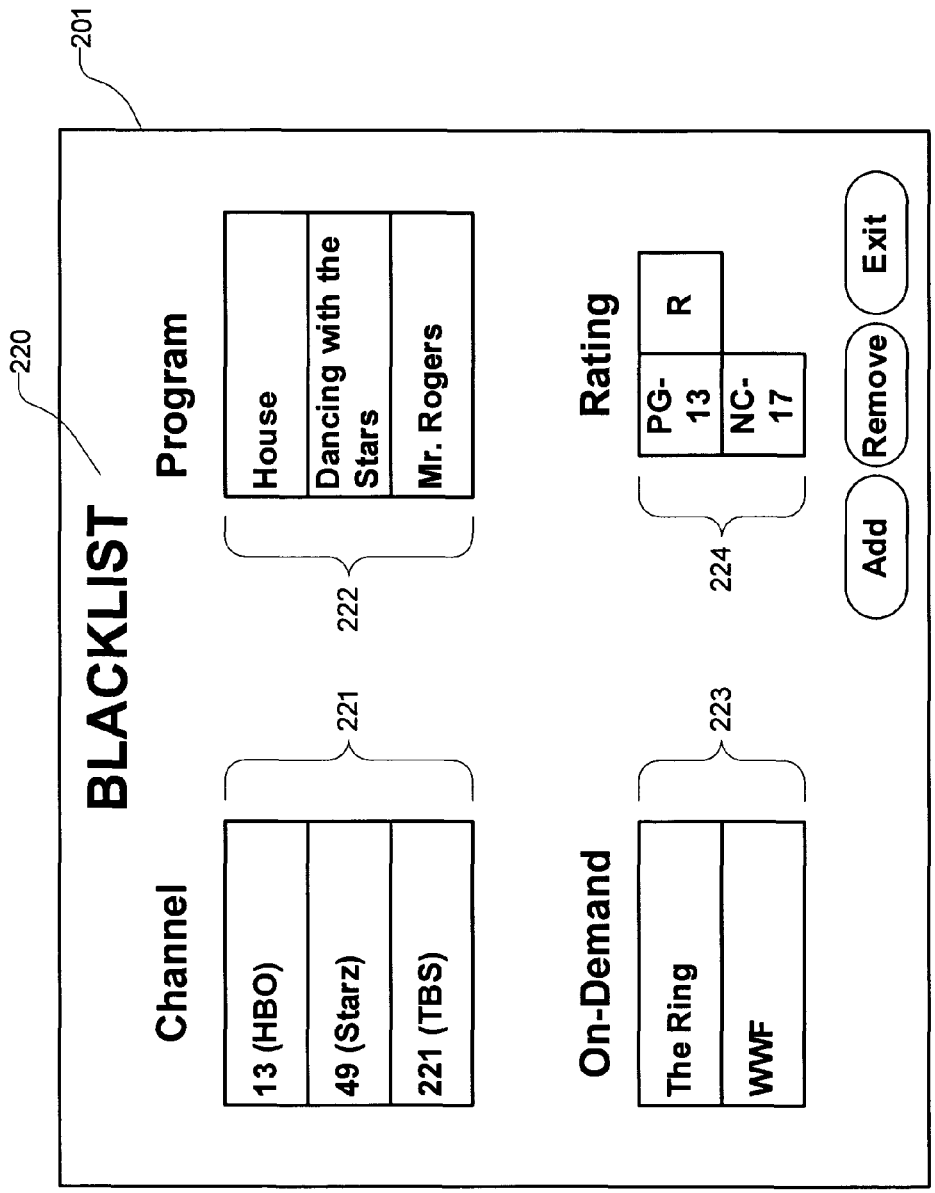
FIG. 12 illustrates an exemplary blacklist that may be a part of a particular user profile according to principles described herein.

A user profile may additionally or alternatively include a blacklist specifying one or more media content access restrictions. For example, FIG. 12 illustrates an exemplary blacklist 220 that may be a part of a particular user profile. As shown in FIG. 12, the blacklist 220 may be displayed as a GUI on the viewing screen 201 of the display device 112. Additionally or alternatively, the whitelist 200 may be displayed on any other access device 114. In some examples, the blacklist 220 may include an editable listing of channels 221, specific media content instances 222 and 223, and content ratings 224 that are blocked or prevented from being accessed while within the user profile. The contents of the blacklist 220 may be edited to include any additional or alternative listing as may serve a particular user profile.

In some examples, an input device 113 assigned to a particular user profile having the blacklist 220 may be blocked from accessing any media content instance specified by the entries contained within the blacklist 220. For example, an input device 113 assigned to a user profile having the blacklist 220 shown in FIG. 12 is blocked from accessing any of the channels listed within the blacklist 220 (e.g., HBO, STARZ, and TBS), any of the specific media content instances 222 and 223 listed within the blacklist 220 (e.g., HOUSE, DANCING WITH THE STARS, MR. ROGERS, THE RING, and WWF), or any media content instance having any of the ratings 224 listed within the blacklist (e.g., PG-13, R, and NC-17).

Figure 13:
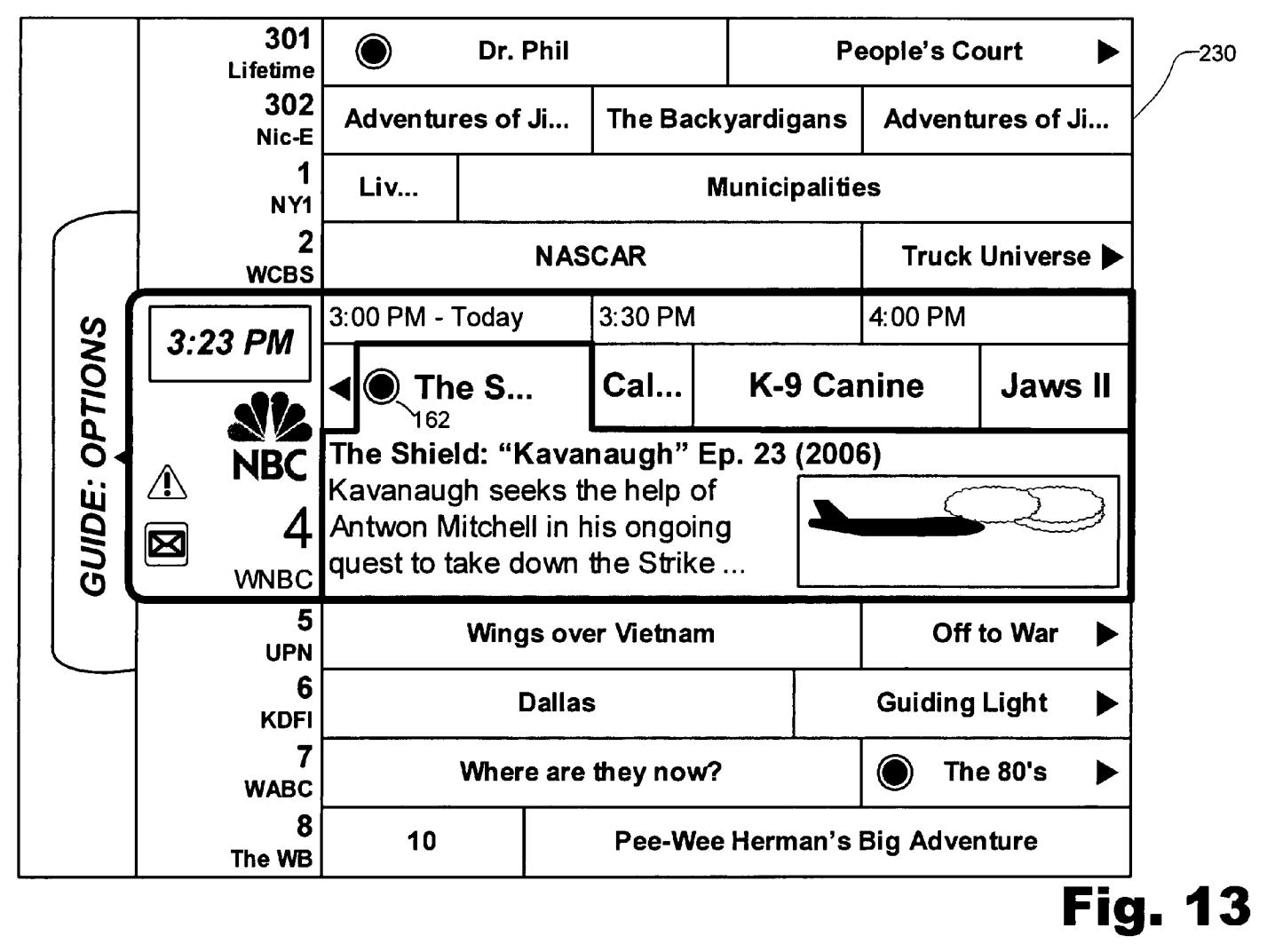

A user profile may also include one or more customized display settings. For example, a user profile may specify a particular layout of a program guide GUI. FIG. 13 illustrates an exemplary program guide GUI 230 that may be displayed by the display device 112. As shown in FIG. 13, the program guide GUI 230 may be configured to display detailed program information corresponding to a number of media content instances that may be accessed via the processing subsystem 110. The detailed program information may include, but is not limited to, start and stop times, titles, plot summaries, and various graphics related to one or more of the media content instances.

However, some users may desire to only view a limited number of items within a program guide GUI 230. Moreover, in some instances, a parent or other user may desire to limit the program information displayed within the program guide GUI 230 when the program guide GUI 230 is accessed by a child. Hence, in some examples, the contents of the program guide GUI 230 may be specified and included as a part of a particular user profile.

Figure 14:
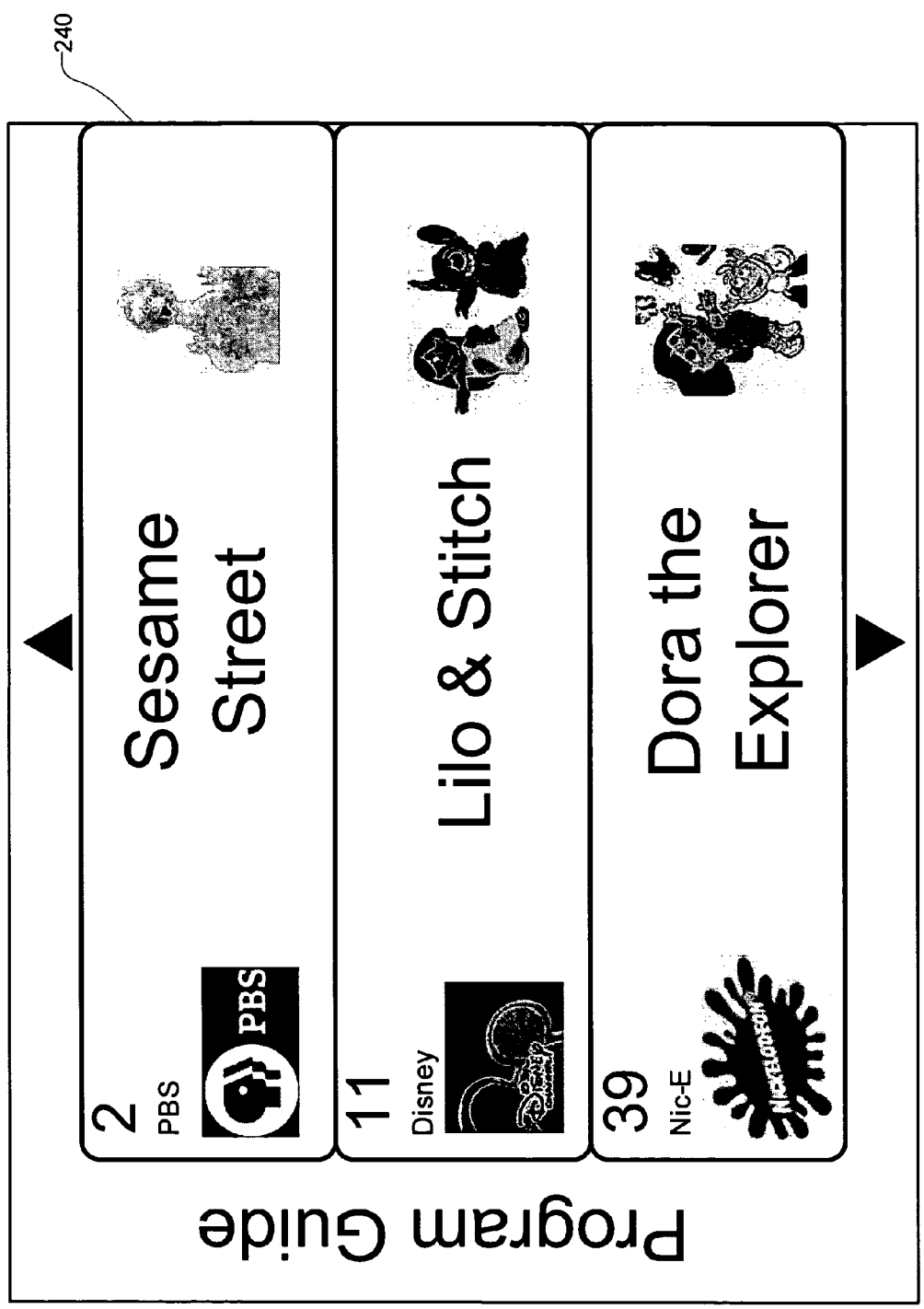
FIG. 14 illustrates an exemplary program guide graphical user interface that may be a part of a user profile created for a child according to principles described herein.

For example, FIG. 14 illustrates an exemplary program guide GUI 240 that may be a part of a user profile created for a child. It will be recognized that the program guide GUI 240 is simplified in comparison to the program guide GUI 240 illustrated in FIG. 13. As shown in FIG. 14, the simplified program guide GUI 240 may be configured to display only the channel numbers and logos, a number of media content instance titles, and/or a number of graphics corresponding to the media content instance titles. However, it will be recognized that the program guide GUI 240 shown in FIG. 14 may be configured to display any type of program information as may serve a particular user profile.

Figure 15:
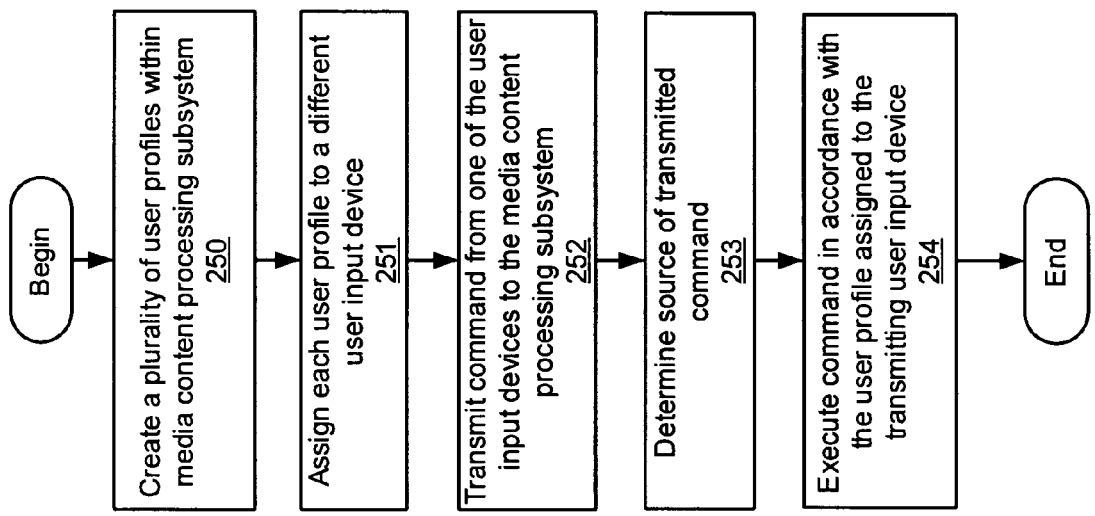
FIG. 15 illustrates an exemplary method of providing access to one or more media content instances that may be available via the media processing subsystem according to principles described herein.

FIG. 15 illustrates an exemplary method of providing access to one or more media content instances that may be available via the media processing subsystem 110. The steps shown in FIG. 15 are merely illustrative and may be omitted, added to, reordered, and/or modified in any way.

In step 250, a plurality of user profiles are created within the media content processing subsystem 110. The user profiles may include any customized setting related to media content that is accessible via the processing subsystem 110.

Each of the user profiles is then assigned to a different user input device 113 within a plurality of input devices 113, as shown in step 251. In some alternative examples, one or more of the user profiles may each be assigned to multiple user input devices 113 so that each of the multiple user input devices 113 may control the processing subsystem 110 in a similar manner.

A command may then be transmitted by one of the input devices 113 to the media content processing subsystem 110, as shown in step 252. The command may include a combination of one or more control codes corresponding to a combination of one or more of the buttons that are a part of the input device 113. In some examples, the one or more control codes transmitted by the input device 113 may be chosen from a set of partitioned control codes that are unique to that particular input device 113. Additionally or alternatively, a unique input device identifier may be included within the command that is transmitted by the input device 113 to the processing subsystem 110.

In step 253, the processing subsystem 110 determines the source of the transmitted command. In other words, the processing subsystem 110 determines which input device 113 transmitted the command. In step 254, once the source of the transmitted command has been determined, the processing subsystem 110 executes the command in accordance with the user profile assigned to the input device 113 that transmitted the command.

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
a media content processing subsystem; and
a plurality of user input devices, wherein each user input device includes a plurality of controls and is assigned by said media content processing subsystem a set of control codes unique to said user input device partitioned from a total number of control codes, wherein each said control is assigned one of said set of control codes, wherein each user input device is configured to transmit at least one command to said media content processing subsystem comprising at least one control code selected from said set of control codes unique to said user input device; and
wherein, when said processing subsystem receives a command from one of said user input devices, said processing subsystem is configured to;
identify said one of said user input devices based on said at least one control code unique to said one of said user input devices;
execute said command in accordance with a user profile corresponding to said identified one of said user input devices; and
execute at least one of a plurality of applications, wherein each of said control codes assigned to said user input devices is further assigned to one of said plurality of applications by said media content processing subsystem.

2. The system of claim 1, wherein when said processing subsystem receives another command from another of said user input devices, said another command comprising at least one control code selected from another set of control codes unique to said another user input device, said processing subsystem is further configured to:
identify said another of said user input devices based on said at least one control code selected from said another set of control codes; and
execute said another command in accordance with a user profile corresponding to said another of said user input devices.

3. The system of claim 1, wherein said user profile that corresponds to said one of said user input device comprises at least one setting configured to customize an interaction between at least one user of said one of said user input device and said processing subsystem.

4. The system of claim 3, wherein said at least one setting comprises at least one of a whitelist specifying at least one accessible media content instance, a blacklist specifying at least one restriction corresponding to at least one media content instance, and at least one display setting.

5. The system of claim 4, wherein said at least one display setting comprises at least one setting specifying one or more contents of a program guide graphical user interface.

6. The system of claim 1, wherein said processing subsystem is further configured to assign said distinct user profiles to each of said user input devices.

7. The system of claim 1, wherein said plurality of said user input devices comprises at least an input device configured to be used by an adult and an input device configured to be used by a minor.

8. The system of claim 1, wherein said plurality of user input devices comprises a simplified user input device and another user input device.

9. The system of claim 8, wherein said simplified user input device is associated with a set of control codes that are unique to said simplified user input device.

10. The system of claim 8, wherein said user profile that corresponds to said simplified user input device comprises a display setting specifying a simplified program guide graphical user interface.

11. The system of claim 8, wherein said simplified user input device is associated with a set of control codes that are unique to said simplified user input device, wherein said another user input device is associated with a second set of control codes that are unique to said another user input device, and wherein said set of control codes and said second set of control codes each include a control code indicating the same command.

12. The system of claim 1, wherein at least a subset of controls that are a part of a particular user input device are each assigned a unique control code within said set of control codes unique to said user input device.

13. The system of claim 1, wherein each set of control codes consists of a single consecutive run of control codes from the total of control codes.

14. An apparatus comprising:
a receiver configured to receive at least one command from a plurality of user input devices, wherein each user input device includes a plurality of controls and is assigned by said receiver a set of control codes partitioned from a total number of control codes capable of being received by said receiver and unique to said user input device, said set of control codes being unique to said user input device independent of a device identifier assigned to said user input device, wherein each said control is assigned a control code from said set of control codes, and wherein said command includes a control code assigned to one of said plurality of controls; and
a processor communicatively coupled to said receiver;
wherein, when said receiver receives a command from one of said user input devices, said processor is configured to identify said one of said user input devices according to said control code included in said command and execute said command in accordance with a user profile corresponding to said identified one of said user input devices, wherein said processor is further configured to execute at least one of a plurality of applications, wherein each of said control codes assigned to said user input devices is further assigned to one of said plurality of applications.

15. The apparatus of claim 14, wherein when said receiver receives another command from another of said user input devices, said another command comprising another control code selected from another set of control codes unique to said another user input device, said processor is further configured to:
identify said another of said user input devices according to said another control code; and
execute said another command in accordance with a user profile corresponding to said another of said user input devices.

16. The apparatus of claim 14, wherein said user profile that corresponds to said one of said user input devices comprises at least one setting configured to customize an interaction between at least one user of said one of said user input devices and said apparatus.

17. The apparatus of claim 16, wherein said at least one setting comprises at least one of a whitelist specifying at least one accessible media content instance, a blacklist specifying at least one restriction corresponding to at least one media content instance, and at least one display setting.

18. The apparatus of claim 14, wherein said processor is further configured to assign said distinct user profiles to each of said user input devices.

19. The apparatus of claim 14, wherein said plurality of said user input devices comprises at least an input device configured to be used by an adult and an input device configured to be used by a minor.

20. The apparatus of claim 14, wherein each assigned control code is unique across all of said plurality of user input devices.

21. The apparatus of claim 14, wherein a first user interface device in said plurality of user interface devices is assigned a different number of control codes than a second user interface device in said plurality of user interface devices.

22. The apparatus of claim 14, wherein the number of control codes in each of said sets of control codes varies according to said one of said plurality of applications to which it is assigned.

23. The apparatus of claim 14, wherein said plurality of applications includes at least two of a personal video recording application, a program guide application, and a user profile application.

24. A method comprising:
partitioning, by a receiver, a total number of control codes capable of being received by the receiver into a plurality of sets of control codes, each said set of control codes including a plurality of control codes unique to that particular set;
assigning, by the receiver, one of said plurality of sets of control codes to each one of a plurality of user input devices, each of said user input devices including a plurality of controls and being configured to transmit at least one command selected using said plurality of controls to a processor configured to provide access to at least one media content instance, the control codes being unique to said user input device independent of a device identifier assigned to said user input device;
processing a command that is transmitted by one of said user input devices, said command comprising a control code assigned to one of said plurality of controls from said set of control codes unique to said one of said user input devices;
identifying said one of said user input devices based on said control code unique to said one of said user input devices and included in said command;
executing said command in accordance with a user profile corresponding to said identified one of said user input devices; and
executing at least one of a plurality of applications, wherein each of said control codes assigned to said user input devices is further assigned to one of said plurality of applications.

25. The method of claim 24, further comprising:

processing another command that is transmitted by another of said user input devices, said another command comprising a control code selected from a set of control codes that are unique to said another of said user input devices;

identifying said another of said user input devices based on said command; and executing said command in accordance with a user profile corresponding to said another of said user input devices.

26. The method of claim 24, wherein said user profile that corresponds to said one of said user input device comprises at least one setting configured to customize an interaction between at least one user of said type of said user input devices and said processor configured to provide access to said at least one media content instance.

27. The method of claim 26, wherein said at least one setting comprises at least one of a whitelist specifying at least one accessible media content instance, a blacklist specifying at least one restriction corresponding to at least one media content instance, and at least one display setting.

28. The method of claim 27, wherein said at least one display setting comprises at least one setting specifying one or more contents of a program guide graphical user interface.

29. The method of claim 24, wherein said plurality of said user input devices comprises at least an input device configured to be used by a guardian and an input device configured to be used by a ward of said guardian.

* * * * *